United States Patent [19]

Korin

[11] Patent Number: 5,146,997
[45] Date of Patent: Sep. 15, 1992

[54] LAKE WEED REMOVING APPARATUS

[76] Inventor: Mark R. Korin, 866 - 124th La. NE., Blaine, Minn. 55434

[21] Appl. No.: 808,109

[22] Filed: Dec. 16, 1991

[51] Int. Cl.$^5$ .................. A01B 33/16; A01D 44/00
[52] U.S. Cl. .......................................... 172/42; 56/8
[58] Field of Search ................. 172/42; 405/191, 192; 56/8, 9; 299/8; 171/115, 116; 37/66, 64

[56] References Cited

U.S. PATENT DOCUMENTS

| | | |
|---|---|---|
| 1,028,486 | 6/1912 | Paxton . |
| 1,814,649 | 7/1931 | Wade . |
| 1,891,854 | 12/1932 | Wade . |
| 2,601,752 | 7/1952 | Rose . |
| 2,665,621 | 1/1954 | Smith et al. . |
| 2,793,576 | 5/1957 | Carpi . |
| 2,934,876 | 5/1960 | Perrino . |
| 3,802,022 | 4/1974 | Fleming ........................ 56/9 |
| 4,043,402 | 8/1977 | Nelson . |
| 4,196,566 | 4/1980 | Donnelley . |
| 4,202,155 | 5/1980 | Stewart . |
| 4,286,670 | 9/1981 | Ackerman ................... 172/42 |
| 4,375,299 | 3/1983 | Laven . |
| 4,416,106 | 11/1983 | Hawk . |
| 4,421,177 | 12/1983 | Schlapman et al. . |
| 4,499,710 | 2/1985 | Bolton . |
| 4,713,896 | 12/1987 | Jennens ........................ 56/9 |
| 4,815,234 | 3/1989 | Connolly . |
| 4,854,058 | 8/1989 | Sloan et al. ................... 37/63 |
| 4,895,210 | 1/1990 | Witzel ........................ 172/42 |
| 4,920,733 | 5/1990 | Berrios . |
| 4,942,682 | 7/1990 | McDowell .................... 37/66 |
| 5,048,617 | 9/1991 | Haven ........................ 172/42 |

FOREIGN PATENT DOCUMENTS 2138473 10/1984 United Kingdom ................ 299/8

Primary Examiner—Randolph A. Reese
Assistant Examiner—Spencer Warnick
Attorney, Agent, or Firm—Haugen and Nikolai

[57] ABSTRACT

A weed removing apparatus suitable for grubbing weeds from a lake bottom. The apparatus includes a land-based unit including a combustion engine driving an hydraulic pump, and a separate submersible unit including a hydraulic motor which is driven by the hydraulic pump of the land-based unit via an elongated hose. The submersible unit inlcudes a rotatable drum including several tines extending radially outward therefrom for grubbing weeds and which is driven by the hydraulic motor. The submersible unit includes wheels which are propelled by the hydraulic motor. A handle extending from the submersible unit provides a steering mechanism to the operator for guiding the submersible unit about the lake bottom in the area desired to be cleared of weeds. The land-based unit further includes a take-up reel for storing a substantial length of hose when not in use. The hose also includes several spaced-apart flotation devices for buoying the hose upon the water surface to avoid entanglement and snaring about the lake bottom or with weeds. The submersible unit is easily maneuvered and has a large range, and thus is adaptable to a large area of shoreline. The tined drum removes weeds by the roots such that weed regrowth is substantially inhibited. The submersible unit can be used in various depths of water by using an extension handle and is easy to use since the wheels are cleated and propelled by the hydraulic motor. Thus, a mechanized apparatus is provided to reduce the labor required to remove lake weeds.

16 Claims, 3 Drawing Sheets

LAKE WEED REMOVING APPARATUS

BACKGROUND OF THE INVENTION

I. Field of the Invention

This invention relates generally to equipment which is suitable for removing weeds and, more particularly, to a tiller having a submersible portion for grubbing weeds from a lake bottom.

II. Discussion of the Prior Art

Weeds are an annual problem to a lakeshore owner as they are both aesthetically unattractive and inhibit the enjoyment of swimming. Every year, a lake owner is confronted with the laborous task of removing these weeds during the spring and summer months. The problem of removing these weeds is substantially more difficult than removing weeds that grow on land as most commercially available weed removing equipment is relatively ineffective or unsuitable for use below water. Most electrical devices cannot be safely used under water due to the risk of electrocution. Further, water provides resistance and inhibits the effectiveness of mechanical devices which may be operated by hand underwater.

A well-known but cumbersome method of removing weeds is to simply manually rake the bottom using a standard garden rake. This method is frustrating and tiring as it requires extensive manual labor and time. Further, the rake only removes a portion of the weeds with each stroke such that several strokes are necessary to entirely clear a portion of the lake bottom of weeds. The water near the lake bottom typically becomes cloudy while using the rake thus inhibiting the owner from visually observing the area of the lake bottom that the owner is trying to clear of weeds.

Another method of removing lake weeds is to drag a mesh-like rake across the lake bottom, such as a portion of a chain-link fence. Such a device is moderately effective at removing weeds. However, several passes over a portion of lake bottom are also required to substantially remove the weeds. Further, this mesh-like rake requires manual labor and is a very difficult, time-consuming and frustrating procedure.

Both the garden rake and mesh-like rake also suffer from the fact that they do not entirely remove the roots of the weeds, hence, the weeds grow back very quickly and the results are only temporary, at best. Thus, a mechanized apparatus for making the job of removing weeds and roots easier, and which is highly more effective to prevent immediate weed regrowth is most desirable.

OBJECTS

It is accordingly a principal object of the present invention to provide a weed grubbing apparatus which is mechanized to reduce the work load of the operator and to reduce the time required to grub weeds.

A further object of the present invention is to provide a weed grubbing apparatus which is more effective for grubbing weeds and which substantially reduces the rapid regrowth of weeds in a cleared area.

A further object of the present invention is to provide an improved weed grubbing apparatus which is submersible.

A further object of the present invention is to provide a weed grubbing apparatus which can be used at various depths of a lakeshore and which can be maneuvered about a large area of shoreline.

SUMMARY OF THE INVENTION

The foregoing features and objects are achieved by providing a two-piece apparatus including a land-based unit hydraulically powering a separate maneuverable submersible unit which includes a tiller for grubbing weeds by the roots. The land-based unit comprises a first housing containing a combustion engine drivingly engaging an hydraulic pump. A substantial length of hose having a pair of passageways extends from the hydraulic pump wherein each passageway encloses a substantially noncompressible fluid. A separate submersible unit comprises a second housing including an hydraulic motor receiving the hose from the land-based unit. The hydraulic pump of the land-based unit hydraulically drives the hydraulic motor of the submersible unit via the hose. The submersible unit includes a rotatable drum drivingly coupled to the hydraulic motor. The drum includes several tines extending radially outward for grubbing weeds by the roots when the drum is rotated. The submersible unit includes wheels rotatably attached to the second housing for supporting the housing on the lake bottom. A handle extends from the second housing for providing a steering mechanism for the submersible unit. Thus, the land-based unit provides hydraulic power to the submersible unit to rotatingly drive the drum to clear weeds from the lake bottom.

A further embodiment of the invention includes the wheels of the submersible unit also being drivingly coupled to the hydraulic motor such that the submersible unit is self-propelled about the lake bottom to further reduce the workload upon the operator. The wheels preferably have several cleats to provide traction while engaging the lake bottom.

A further embodiment of the invention includes a take-up reel attached to the land-based unit for storing the substantial length of hose. The hose can be dispensed from the reel such that the submersible unit can be conveniently operated at a considerable distance from the land-based unit.

A further improvement of the invention includes several spaced flotation devices attached to the hose for buoying the hose upon the water surface. Thus, the submersible unit can be maneuvered without getting entangled with the hose. Further, the floatation devices prevent the hose from being caught along the lake bottom or in weeds. Thus, the flotation devices provide a convenient arrangement to allow the submersible unit to be effectively operated about a large area of lake bottom without interference from the hose.

A further embodiment of the invention includes several wheels rotatably attached to the first housing of the land-based unit such that the land-based unit is easily transported upon land. A further embodiment of the land-based unit includes a roll-cage fixedly attached to the first housing to protect the enclosed engine and hydraulic pump from damage during use or storage.

This combination of the land-based unit hydraulically powering the submersible unit provides a mechanized weed grubbing apparatus which is highly effective in removing weeds by their roots with a substantially reduced effort by the operator. The submersible unit is easily maneuvered about a large area of lake bottom and is convenient to use since it is steerable and self-propelled.

DESCRIPTION OF THE PREFERRED EMBODIMENT

Figure 1:
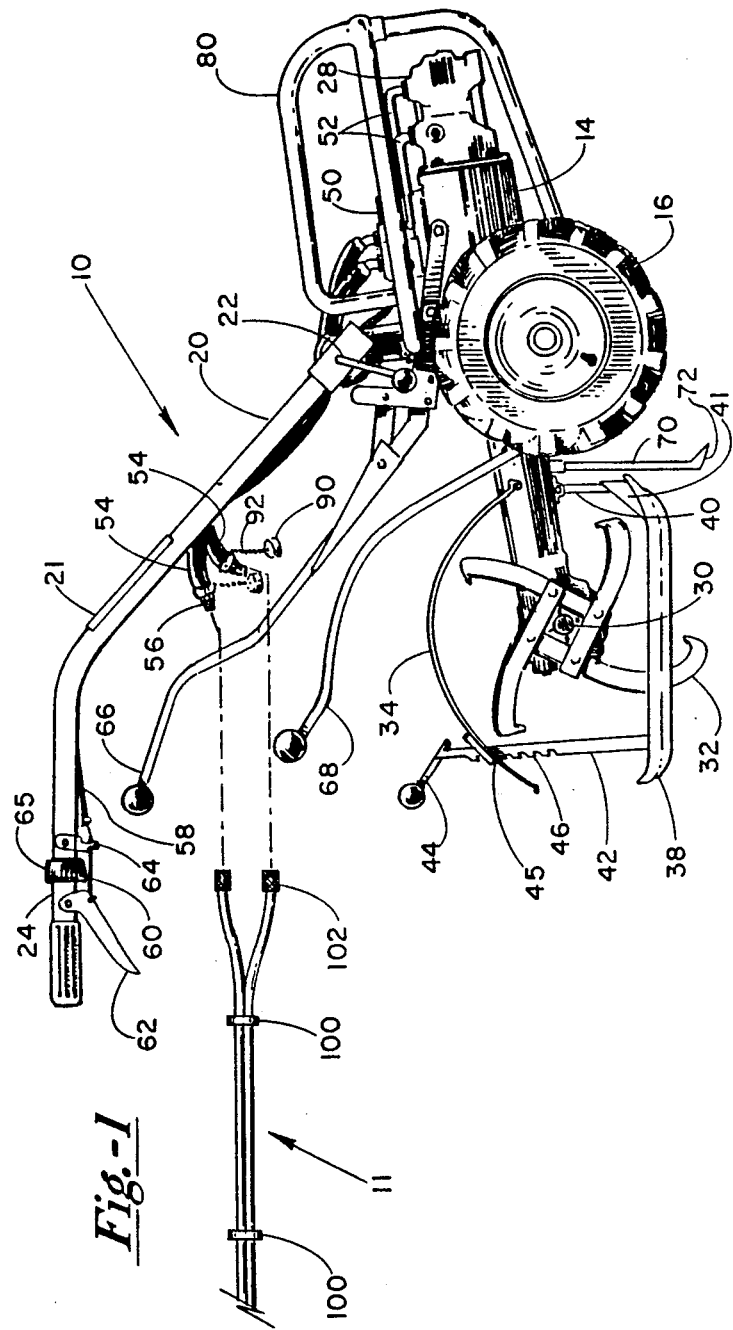
FIG. 1 is a profile view of a submersible tiller and extension hose according to the present invention.
Figure 5:
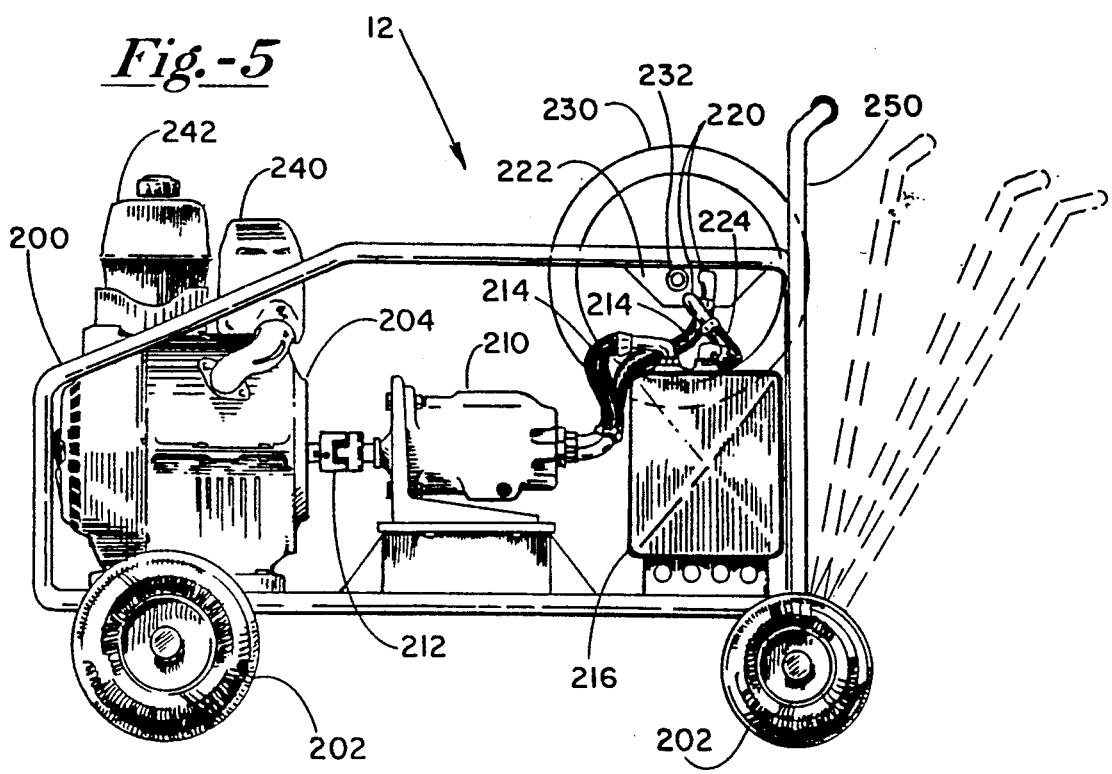
FIG. 5 is a profile view of a land-based power unit adapted to hydraulically drive the submersible tiller shown in FIG. 1.

According to the present invention, a profile view of a submersible tiller is shown in FIG. 1 and generally labeled 10 which is adapted to be hydraulically driven via a flexible hose 11 by a land-based power unit shown in FIG. 5 and generally labeled 12. Referring to FIG. 1, tiller 10 is water-sealed such that it is adapted to be operated under water. Tiller 10 includes a water-tight, elongated, cylindrically-shaped steel chassis 14 which is supported above the lake bottom by a pair of treaded rubber wheels 16 which are each rotatably attached to opposite sides of a central section of chassis 14. A pair of elongated parallel tubular handle bars 20 are attached to an upper central portion of chassis 14 and extend upward and rearward from chassis 14 to provide a means for steering tiller 10 about the lake bottom. Each handle bar 20 is separated from one another by a rigid brace 21 and are selectively adjusted to a desired angle by appropriately positioning a selector handle 22. Each handle bar 20 extends to a handle 24 having a textured grip which is adapted to be gripped by the hands of an operator. A passive-type hydraulic motor 28 is fixedly and sealingly attached to a forward portion of chassis 14. Hydraulic motor 28 is drivingly coupled via a standard geared drive mechanism (not shown) positioned within sealed chassis 14, which is well-known in the art and typically used in standard garden cultivators, to each of wheels 16 and to a tiller drum 30. Tiller drum 30 is journaled for rotation in a rear portion of chassis 14 and extends laterally to each-side of chassis 14. Tiller drum 30 includes several tines 32 running the entire length thereof each side of chassis 14 wherein each tine 32 extends radially outward therefrom. An arcuate shaped tiller hood or guard 34 is attached to a rear portion of chassis 14 and extends over and closely proximate each tine 32 to protect the operator from injury by rotating tines 32.

A pair of elongated skids 38 are attached to chassis 14 via a first supporting member 40 which extends vertically downward from a central portion of chassis 14 to a central portion of a first rigid brace 41 which extends between each front portion of each skid 38. A second supporting member 42 is similarly attached to a central portion of a second rigid brace (not shown) which extends between a rear central portion of each skid 38. Second member 42 extends upward through a notched opening 45 defined in a rear portion of guard 34 to a handle 44. Supporting member 42 includes a plurality of notches defining several teeth 46 which can be selectively positioned to engage opening 45 defined in tiller guard 34 by maneuvering handle 44. Members 40 and 42 in combination with each skid 38 support the rear portion of chassis 14 above the lake bottom. Tiller drum 30 is selectively positioned above the lake bottom at a height determined by the length of member 42 defined below guard 34. Consequently, the depth tines 32 extend into the lake bottom is also determined by the length of member 42. Each skid 38 is substantially flat having a smooth bottom surface such that each skid 38 can easily slide upon the lake bottom with little resistance. The front and rear portions of each skid 38 is curved upward to avoid interference with the lake bottom.

A hydraulic control mechanism 50, which is well known in the art, is fixedly attached upon an upper forward portion of chassis 14. A pair of hydraulic hoses 52 containing hydraulic fluid communicate hydraulic fluid between an output side of control mechanism 50 and hydraulic motor 28. A pair of hydraulic hoses 54 containing hydraulic fluid are each attached to an input side of control mechanism 50 and are in fluid communication therewith. One of hose 54 serves as a supply or source line of hydraulic fluid to control mechanism 50, and the other serves as a return line of hydraulic fluid from control mechanism 50. Each hose 54 extends upward to and terminates at a standard spring-loaded ball-type connector 56 which are each adapted to receive and communicate hydraulic fluid with a separate respective passageway of hydraulic hose 11. Control mechanism 50 selectively controls the communication of hydraulic fluid from each hydraulic hose 54 to each hydraulic hose 52, and subsequently to hydraulic motor 28. Control mechanism 50 has two positions; a first position such that hydraulic fluid freely communicates from each respective hose 54 to the corresponding hose 52 such that hydraulic motor 28 is engaged. In a second position, control mechanism 50 interrupts the communication of fluid from each hose 54 to each respective hose 52 such that hydraulic motor 28 is disabled. A pair of wire cables 58 each extend from control mechanism 50 to a respective short piece of rigid wire 60 via a pivoting member 64. Wire 60 in turn is connected to a lever 62 which is pivotably attached to each handle 24. If either lever 62 is released by the operator, control mechanism 50 switches to the second position to stop operation of hydraulic motor 28. This design provides an inherent safety mechanism as well. Rigid wire 60 is selectively detachable from member 64 to allow extension handles to be adapted to handle bars 20, as will be discussed shortly. Each handle 24 has a threaded end adapted to be received into a threaded coupling 65 which is rotatably fastened to an end of each handle bar 20 such that each handle 24 can be removed by rotating each coupling 65.

An elongated handle 66 is mechanically coupled to the drive mechanism positioned in chassis 14 (not shown) at a location between hydraulic motor 28 and wheels 16. Handle 66 extends rearward under handles 20 toward the operator. Handle 66 selectively controls the rotation direction of wheels 16, which in turn self-propel tiller 10 upon the lake bottom, by adjusting the geared driving mechanism in chassis 14. Since hydraulic motor 28 also drivingly engages tiller drum 30, handle 66 also controls the direction of rotation of tiller drum 30. For example, when handle 66 is in its first position, as shown in FIG. 1, wheels 16 are rotated clockwise to propel tiller 10 in the forward direction, wherein tiller drum 30 is rotated counter clockwise. Handle 66 is also positionable in a second position wherein wheels 16 are rotated counter clockwise to reverse the direction tiller 10 is propelled, wherein tiller drum 30 is rotated in the clockwise direction. Handle 66 also includes a third position, or a neutral position, wherein hydraulic motor 28 is disengaged from wheels 16 and tiller drum 30 altogether.

A second control handle 68 is mechanically coupled to chassis 14 between wheels 16 and tiller drum 30 for selectively controlling the wheel speed of wheels 16. When handle 68 is in a first position, the driving mechanism (not shown) residing in chassis 14 drives wheels 16 at a high speed. In a second position, the driving mechanism drives the wheels 16 at a slow speed such as one-half high speed, using gear reduction which is well known in the art. Finally, in the third position, handle 68 disengages wheels 16 from the driving mechanism altogether such that the wheels 16 are free to rotate and tiller 10 can be manually pushed. Thus, each handle 66 and 68 has three positions providing distinct functions as described. However, it is noted that more than two wheel speed settings could be implemented and limitation to two speeds is not to be inferred.

A wedge member 70 is pivotally attached to a lower and rearward portion of chassis 14 between wheels 16 and tiller drum 30. Member 70 extends vertically downward from chassis 14 beyond a plane defined by each skid 38 and into the lake bottom. Member 70 has a wedge portion 72 which faces forward when tiller 10 is propelled in the forward direction, and is angled downward to urge chassis 14 downward when tiller 10 is propelled in either direction to keep each skid 38 upon the bottom surface of the lake. By urging the chassis 14 downward, when propelled each tine 32 tills a uniform depth of lake bottom to grub lake weeds as tiller 10 is propelled across the lake bottom. Since member 70 is pivotable about a vertical axis, if tiller 10 is propelled in the reverse direction, wedge member 72 naturally pivots 180 degrees such that chassis 14 is similarly urged downward to ensure tines 32 continue to engage the lake bottom. Member 70 can be retracted forward when tiller 10 is being transported, such as by releasing a lock or its equivalent proximate chassis 14.

A bumper frame 80 is fixedly attached to a forward portion of chassis 14 and extends about control mechanism 50 and hydraulic motor 28 to reduce the likelihood of physical damage to each of these members while submerged, or while being maneuvered on land and eventually stored.

A cap 90 is attached to each hose 54 by a respective short segment of chain 92. Cap 90 is adapted to cover and protect the standard spring loaded ball-type connector 56 attached at the end of each hose 54 when tiller 10 is not in use, or when hose 11 is disconnected from tiller 10.

Hydraulic hose 11 comprises a pair of passageways wherein one serves as a source line, and the other serves as a return line for communicating hydraulic fluid between power unit 12 and tiller 10. Each passageway terminates to a connector 102 which is adapted to sealingly couple to the respective connector 56 of tiller 10. Several floatation members 100 are attached to hose 11 at evenly spaced intervals to buoy hose 11 upon the surface of the water during operation of the present invention. Floatation members 100 provide a convenient arrangement to reduce interference and entanglement of the hose 11 with the rotating tined drum 30. Further, floatation members 100 prevent the hose 11 from becoming entangled in weeds or snagged along the lake bottom.

Figure 2:
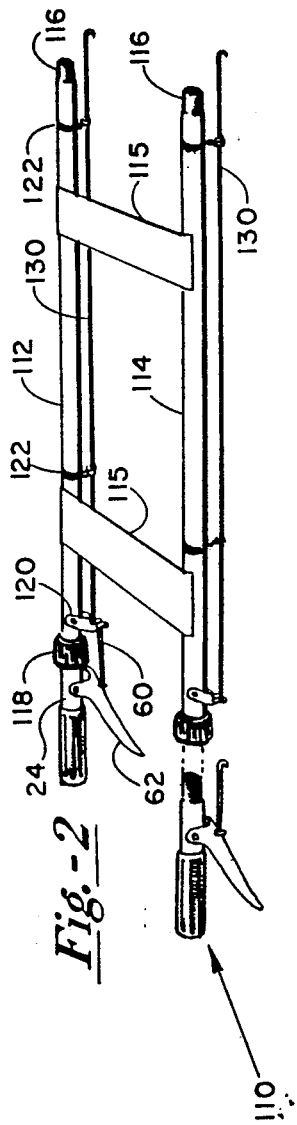
FIG. 2 is a perspective view of an extension handle adaptable to the submersible tiller shown in FIG. 1.

Referring to FIG. 2, an extension handle 110 is shown having a pair of parallel elongated rigid tubular rods 112 and 114 separated by a pair of spaced rigid braces 115. Extension handle 110 can be attached to handlebars 20 by first removing handles 24 by rotating each coupling 65 (see FIG. 1) on handlebars 20 and detaching rigid wire 60 from member 64. Next, a threaded portion 116 defined at an end of each rod 112 and 114 is inserted into each respective end of handle bars 20. Each threaded fastener 65 is then rotated to fixedly attach each tubular rod 112 and 114 to handlebars 20. Each handle 24 is then attached to the opposite end of each respective rod 112 and 114 by rotating a pair of couplings 118, which are similar to couplings 65. Each rigid wire 60 is then attached to a member 120 which is pivotably attached to each tubular rod 112 and 114. A pair of rigid rods 130 are each slidably received in a sleeve of a pair of stationary clips 122. A separate pair of clips 122 are attached to each of rods 112 and 114. Rods 130 couple each member 120 to the respective member 64 such that levers 62 again are connected to control mechanism 50. This extension handle allows the operator to operate in deeper water, or, to distance himself further from tiller 10. Multiple sections of handles 110 may also be linked together in series to provide an even longer extension handle.

Figure 3:
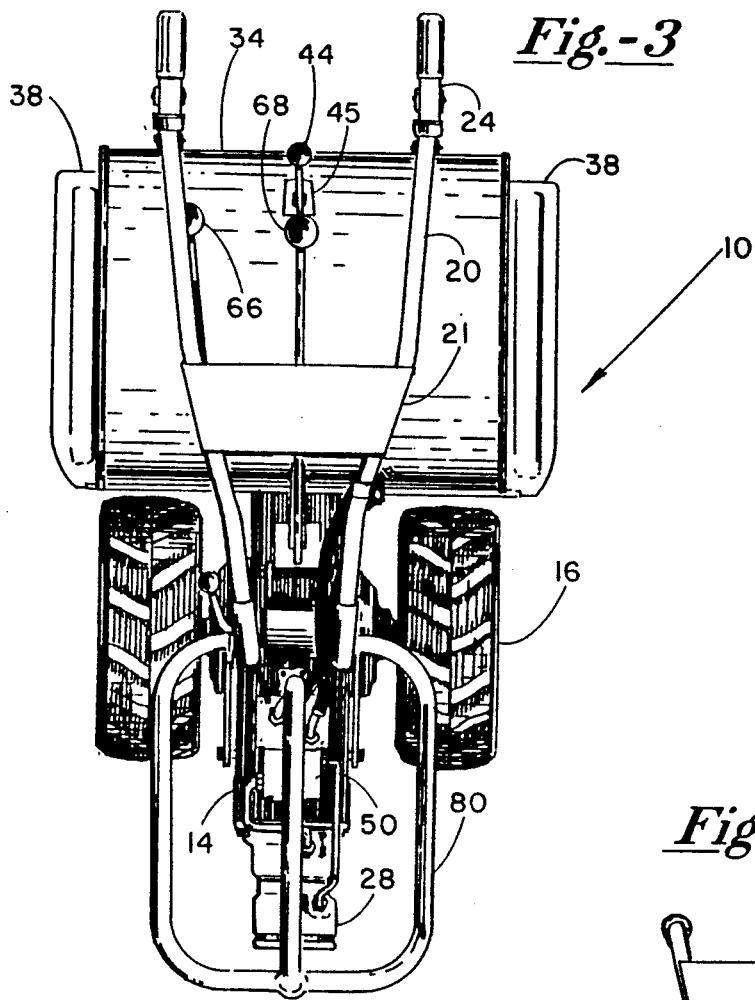
FIG. 3 is a top view of the submersible tiller unit according to the present invention.
Figure 4:
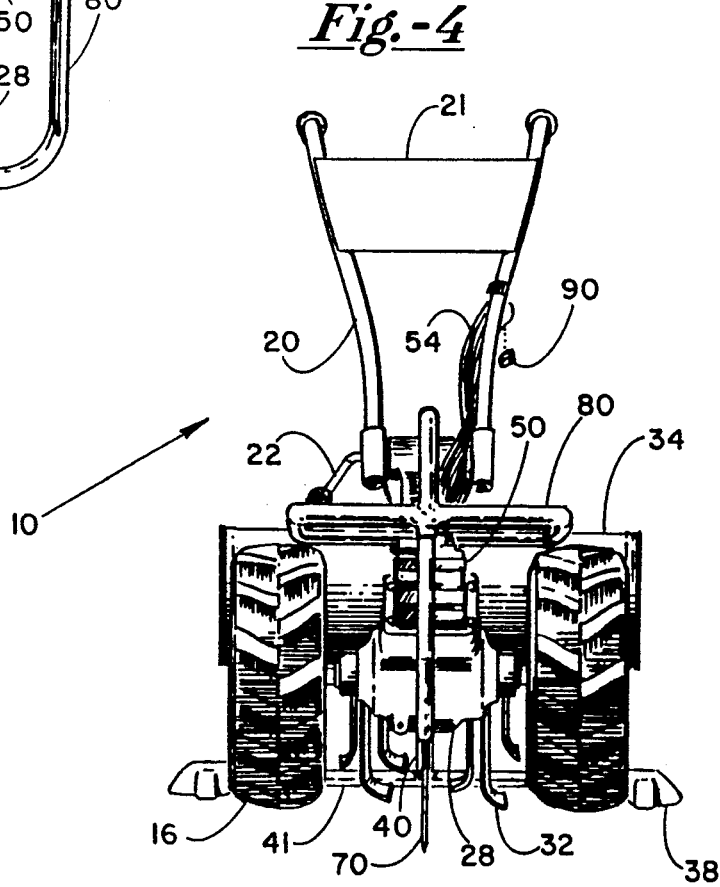
FIG. 4 is a frontal view of the submersible tiller unit according to the present invention.

Referring now to FIGS. 3 and 4, a top and frontal view, respectively, is shown to further illustrate tiller 10 including the shape of tines 32, bumper frame 80 and handle bars 20. The weight distribution of tiller 10 is roughly balanced about wheels 16, however, the rear portion is slightly heavier than the front portion to urge the rearward portion downward while grubbing weeds.

Referring now to FIG. 5, land-based power unit 12 will now be described in considerable detail. Unit 12 comprises a rectangular and box-like tubular frame 200 supported by four wheels 202, two at a forward and two at a rearward location. Wheels 202 are each rotatably adapted to frame 200 to facilitate transporting land-based unit 12 about the lake shore, both during use and when ultimately stored away when not in use. A standard internal combustion engine 204 is mounted to a forward portion of frame 200, for instance, a 12-horsepower single-cylinder engine which is well known in the art. However, it is recognized that an electric motor or other functionally suitable power means may be used as well, and limitation to an internal combustion engine is not to be inferred. Engine 204 is drivingly coupled to a hydraulic pump 210 via a standard flexible dampening coupling 212, which is also well known in the art. A pair of hydraulic hoses 214 containing hydraulic fluid each extend from a rearward portion of hydraulic pump 210 to communicate hydraulic fluid to and from pump 210. A first one of hoses 214 extends to a fluid reservoir 216 containing a substantial portion of hydraulic fluid. The other one of hose 214 extends to a first hydraulic connector 220 which is mounted in a connector plate 222, wherein plate 222 is connected to frame 200. A fluid return hydraulic hose 224 communicates hydraulic fluid to fluid reservoir 216 from a second hydraulic connector 220 which is also fixedly attached to plate 222. Both hydraulic connectors 220 are standard bulkhead-type connectors which are well known in the art. Thus, when engine 204 is operating to drive hydraulic pump 210, hydraulic fluid is drawn from fluid reservoir 216 via the first one of hydraulic hoses 214, and is subsequently pumped via the other one of hydraulic hoses 214 to the first hydraulic connector 220.

Figure 6:
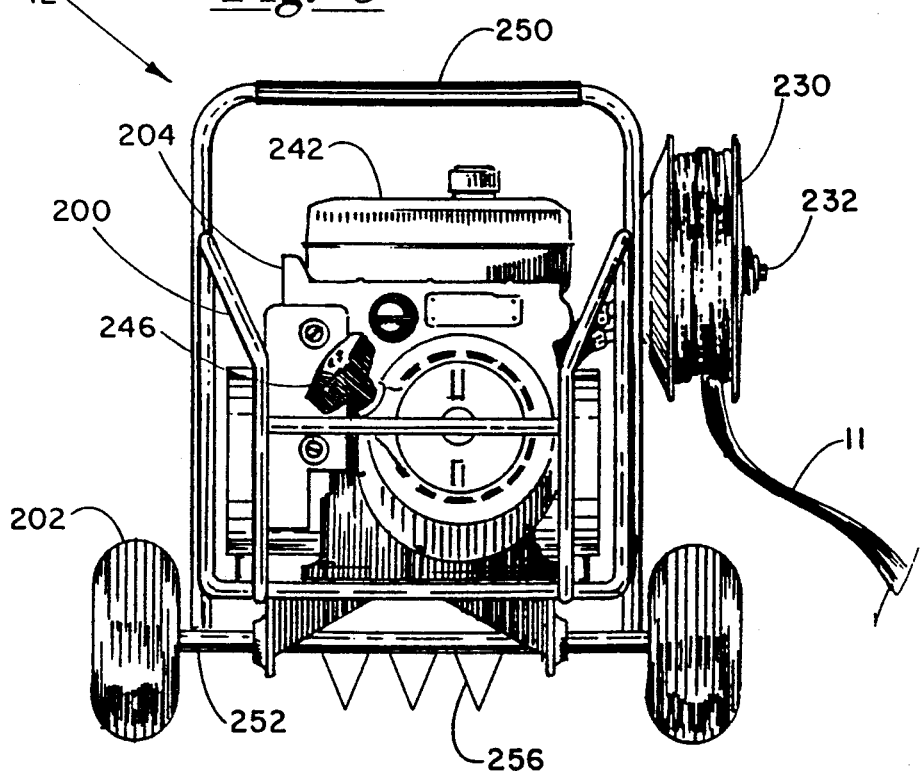
FIG. 6 is a frontal view of the land-based unit according to the present invention.

As illustrated in both FIGS. 5 and 6, a hose reel 230 is rotatably attached to a rearward portion of frame 200. Hose reel 230 is rotatable about a shaft 232 which extends from frame 200 parallel to the earth. Hydraulic hose 11, which is also shown in FIG. 1, is coiled about hose reel 230 to provide a convenient method of storing hydraulic hose 11 when not in use, or for storing the unused portion of hydraulic hose 11 during use of the present invention. Hydraulic hose 11 extends from connectors 220, around reel 230, and to each connector 56 shown in FIG. 1, thus establishing fluid communication from connectors 220 to each of hydraulic hoses 54 of tiller 10. Thus, a complete closed-loop path exists for routing hydraulic fluid from land-based unit 12 to tiller 10, and back again to land-based unit 12. Hose reel 230 may comprise a hose reel assembly similar to reels used to store standard garden hoses, and thus, are well known in the art.

As shown in both FIGS. 5 and 6, engine 204 includes a muffler 240, a gasoline tank 242, and a standard pull cord 246 used to start engine 204. A handle 250 comprised of tubular steel forms a U-shaped handle between the two rear wheels 202. Handle 250 is rotatably adapted at each end to an axle 252 joining the rear wheels 202, as shown in FIG. 6, such that as handle 250 is urged toward the ground, a plurality of wedge-shaped braking tines 256 will be urged into the earth thus establishing a restraining means for inhibiting movement of land-based unit 12 about the earth. This braking means is important to ensure land-based unit 12 is not free to move about the shoreline when the operator is maneuvering tiller 10. For instance, the operator may inadvertently cause hydraulic hose 11 to become taught when the operator is maneuvering tiller 10 at a distant location, thus urging land-based unit 12 towards the water if not restrained. While handle 250 in combination with braking tines 256 provides a method for restraining land-based unit 12 upon the lakeshore, other braking means may be implemented such as locking the hubs of the tires, which is also well known in the art. Axle 252 joining rear wheels 202 can also be pivotably attached to frame 200 such that land-based unit 12 can be steered by handle 250.

Frame 200 serves as both a frame member for supporting each of the components described, and also serves as a roll cage to protect the components from physical damage if bumped, or if the land-based unit 12 should become tipped over or when transported across a hill. Thus, the rigid tubular frame of frame 200 has a dual purpose serving as both a mounting frame and as a roll cage.

OPERATION

A detailed description of the operation of the present invention will now be described in detail. First, the operator ensures hydraulic hose 11 is dispensed from hose reel 230 a sufficient distance and connects each connector 102 to hydraulic connectors 56 as shown in FIG. 1. Once operator ensures both handles 66 and 68 are in the neutral position, the operator starts combustion engine 204 by pulling upon starter cord 246 as shown in FIG. 6. Next, engine 204 is adjusted to a proper speed, wherein hydraulic pump 210 establishes hydraulic pressure in hydraulic hose 11 and hydraulic hoses 54. Next, the operator may maneuver tiller 10 into the water by positioning handle 66 into a position designated "forward". Upon gripping each lever 62 and urging each toward handle 24 by squeezing with the hand, control mechanism 50 allows hydraulic fluid to flow to and from hydraulic motor 28 thus driving wheels 16 in the forward (clockwise) direction. The operator may bring tiller 10 to a stop at any time by simply releasing either one of levers 62.

After maneuvering tiller 10 to a desired starting location in the water, the operator shifts handle 68 into the first position also known as "forward". Next, the operator adjusts handle 44 to establish the depth which tines 32 will be allowed to penetrate into the lake bottom to till the lake weeds. For instance, by positioning the rear portion of guard 34 halfway down the length of teeth 46, the tines 32 may penetrate into the lake bottom four inches. Next, now that the tilling depth has been established, and wherein both the wheels 16 and the tiller drum 30 have been set to the "forward" position, the operator squeezes both levers 62 toward handles 24 to operator the tiller 10. Tiller 10 will propel itself forward as the tines 32 rotate in the counter clockwise direction to till the lake weeds on the bottom of the lake. In this mode, tiller 10 operates similar to a typical garden tiller, except that the entire area below tiller drum 30 is tilled since tines 32 are defined by the entire width of tiller drum 30. Member 70 is urged into the lake bottom due to the shape of forked-member 72 and the weight of tiller 10 and ensures that skids 38 remain upon the lake bottom by urging the rear portion of chassis 14 downward as tiller 10 is propelled in either the forward are rearward direction.

Other combinations of operation can be set by releasing levers 62 and shifting handle 66 into the reverse position or the neutral position to selectively reverse or disengage, respectively, both tined drum 30 and wheels 16. Also, handle 68 could be shifted into a low speed position to grub denser patches of weeds. Thus, if the operator wishes to reverse tiller 10 to till a selected area of lake bottom a second time, handle 66 may be put into the reverse position such that upon squeezing both levers 62 again, wheels 16 will be propelled in the counter clockwise direction and tined drum 30 will be rotated in the clockwise direction. It is noted that a particular safety feature lies in that if either lever 62 is released, control mechanism 50 is disengaged, or put into a neutral position, such that hydraulic fluid in hydraulic hoses 54 cannot drive hydraulic motor 28.

The internal gear ratio of the drive mechanism (not shown), defined in chassis 14 is such that tined drum 30 rotates 13.5 times for every single rotation of wheel 16. However, this gear ratio may be adjusted to other gear ratios, and limitation to 13.5 revolutions per one rotation to wheel 16 is not to be inferred.

When the operator is done removing lake weeds from the lake bottom using tiller 10, the operator uses handle 44 to raise tined drum 30 above the lake bottom before subsequently transportating back to the lakeshore. The operator uses handle 68 to ensure wheels 16 are set to high speed and uses handle 66 to ensure wheels 16 are engaged in the forward direction to propel tiller 10 back towards the lakeshore. Upon maneuvering tiller 10 to the lake shore, the operator can turn off engine 204 thus ceasing operation of hydraulic motor 210. Hydraulic hose 11 is then disconnected from hydraulic hoses 54, and caps 90 are fastened over the connectors 56 of hydraulic hoses 54 to protect the connectors from damage or contaminants such as dirt and dust. Since each connector 56 and connectors 102 comprises a standard spring-loaded ball-type fastener, hydraulic fluid will not leak from hydraulic hoses 11 and 54 when hydraulic hose 11 is disconnected.

Next, the operator recoils hose 11 about hose reel 230 to take up the extended length of hydraulic hose. To facilitate transportation of both land-based unit 12 back to a storage area, handle 250 is positioned back to a vertical position to disengage braking tines 256 from the earth. Tiller 10 can also be transported by ensuring handle 66 is in the neutral position allowing wheels 16 to rotate such that tiller 10 may be manually pushed into a storage area. During transportation, the operator may choose to let skids 38 slide along the earth to help support a rear portion of chassis 14.

In summary, the present invention provides a mechanized apparatus to facilitate the removal of weeds from a lake bottom. The tiller assembly may be conveniently maneuvered about the lake bottom to remove lake weeds, wherein a hydraulic hose is conveniently buoyed about the surface of the water back to the land-based power generating unit. The wheels and the tined drum are both hydraulically powered by the land-based unit thus reducing the effort required by the operator. The depth that the tined drum is permitted to penetrate into the lake bottom is also selectively adjustable to provide an effective lake weed removal process. The land-based unit includes a convenient hose reel for storing the substantial length of hydraulic hose, wherein the maneuverability of the land-based unit about the lakeshore in combination with the substantial length of hydraulic hose allows tiller assembly to be operated over considerable area of lakeshore lake bottom.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. An apparatus for removing weeds from a lake bottom comprising, in combination:
   (a) a land-based unit, comprising:
      (i) a first housing;
      (ii) a power means attached to said first housing for providing mechanical power;
      (iii) a hydraulic pump drivingly coupled to said power means; and
      (iv) an elongated hose coupled to said hydraulic pump and having a pair of passageways each containing a substantially non-compressible fluid; and
   (b) a submersible unit, comprising:
      (i) a second housing;
      (ii) a hydraulic motor connected to said hose and driven by said fluid in said hose when said fluid is pumped by said hydraulic pump;
      (iii) a drum rotatably attached to said second housing and drivingly coupled to said hydraulic motor, said drum including a plurality of tines extending radially outward for grubbing the weeds when said drum is rotated;
      (iv) wheel means rotatably attached to said second housing for supporting said second housing on said lake bottom;
      (v) steering means connected to said second housing for steering said submersible unit independent of said land-based unit about the lake bottom; and
      (vi) urging means for urging said drum downward in response to said submersible unit being propelled.

2. The apparatus as specified in claim 1 wherein said wheel means of said submersible unit is drivingly coupled to said hydraulic motor to propel said submersible unit.

3. The apparatus as specified in claim 2 wherein said wheel means comprises a pair of wheels each having a plurality of cleats for providing traction upon the lake bottom.

4. The apparatus as specified in claim 1 further comprises at least one elongated skid fixedly attached to said second housing proximate said drum for supporting said second housing above the lake bottom in combination with said wheel means.

5. The apparatus as specified in claim 4 further comprising height adjustment means coupled between said second housing and said skid for selectively adjusting a height of said drum above the lake bottom.

6. The apparatus as specified in claim 1 wherein said land-based unit further includes a take-up reel rotatably attached to said second housing for storing and selectively dispensing said elongated hose.

7. The apparatus as specified in claim 6 wherein said land-based unit further comprises a plurality of wheels each rotatably coupled to said first housing.

8. The apparatus as specified in claim 7 wherein said land-based unit further includes braking means for selectively restraining said first housing from said being transported.

9. The apparatus as specified in claim 1 wherein said hose further includes a plurality of spaced flotation devices for buoying said hose above said lake bottom.

10. The apparatus as specified in claim 1 wherein said first housing extends about said power means and said hydraulic pump to provide a roll cage.

11. The apparatus as specified in claim 1 wherein said power means comprises an internal combustion engine.

12. The apparatus as specified in claim 1 wherein said steering means comprises a handle extending from said second housing.

13. The apparatus as specified in claim 12 wherein said handle is removable for facilitating adaption of an extension handle to said second housing.

14. An apparatus for removing weeds from a lake bottom comprising, in combination:
   (a) a land-based unit, comprising:
      (i) a first housing;
      (ii) a power means attached to said first housing for providing mechanical power;
      (iii) a hydraulic pump drivingly coupled to said power means; and
      (iv) an elongated hose coupled to said hydraulic pump and having a pair of passageways each containing a substantially noncompressible fluid; and
   (b) a submersible unit, comprising:
      (i) a second housing;

(ii) a hydraulic motor connected to said hose and driven by said fluid in said hose when said fluid is pumped by said hydraulic pump;

(iii) a drum rotatably attached to said second housing and drivingly coupled to said hydraulic motor, said drum including a plurality of tines extending radially outward for grubbing the weeds when said drum is rotated;

(iv) wheel means rotatably attached to said second housing for supporting said second housing on said lake bottom; and (v) steering means connected to said second housing for steering said submersible unit independent of said land-based unit about the lake bottom.

15. The apparatus as specified in claim 14 wherein said wheel means of said submersible unit is drivingly coupled to said hydraulic motor to propel said submersible unit.

16. An apparatus for removing weeds from a lake bottom comprising, in combination:

(a) a land-based unit, comprising:
(i) a first housing;
(ii) a power means attached to said first housing for providing mechanical power;
(iii) a hydraulic pump drivingly coupled to said power means;
(iv) an elongated hose coupled to said hydraulic pump and having a pair of passageways each containing a substantially non-compressible fluid, said hose including a plurality of spaced flotation devices for buoying said hose above said lake bottom; and
(v) a take-up reel rotatably attached to said first housing for storing and selectively dispensing said elongated hose; and (b) a submersible unit, comprising:
(i) a second housing;
(ii) a hydraulic motor connected to said hose and driven by said fluid in said hose when said fluid is pumped by said hydraulic pump;
(iii) a drum rotatably attached to said second housing and drivingly coupled to said hydraulic motor, said drum including a plurality of tines extending radially outward for grubbing the weeds when said drum is rotated;
(iv) wheel means rotatably attached to said second housing for supporting said second housing on said lake bottom; and
(v) steering means connected to said second housing for steering said submersible unit independent of said land-based unit about the lake bottom.

* * * * *